June 25, 1963 C. D. PLATT 3,095,182
ATTACHMENT FOR LIFT JACK
Filed July 8, 1960
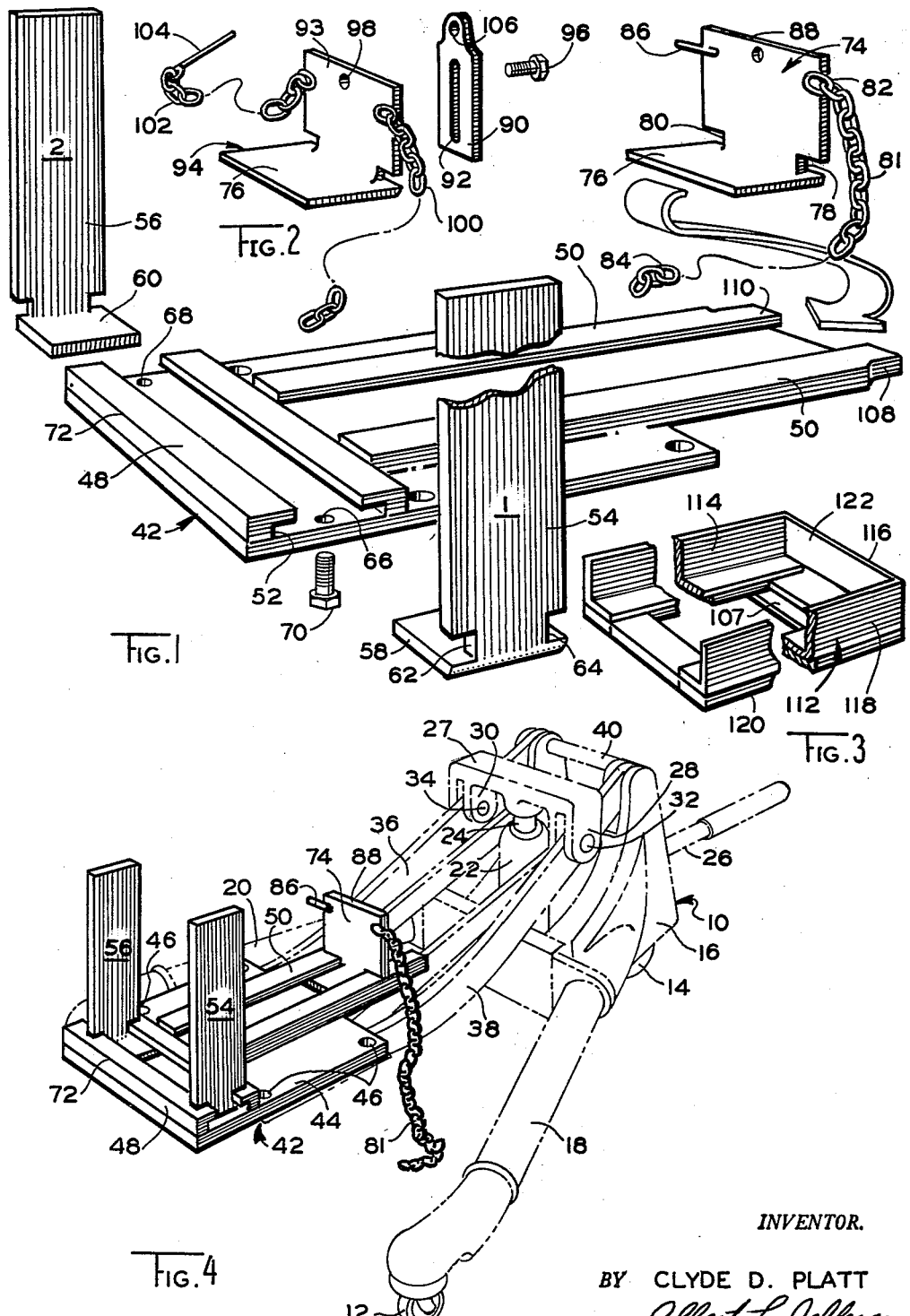
INVENTOR.
BY CLYDE D. PLATT
*Albert L. Jeffers*
ATTORNEY

United States Patent Office 3,095,182
Patented June 25, 1963

3,095,182
ATTACHMENT FOR LIFT JACK
Clyde D. Platt, 3717 McCormick, Fort Wayne, Ind.
Filed July 8, 1960, Ser. No. 41,608
1 Claim. (Cl. 254—134)

This invention relates to an attachment for a lift jack and is especially adapted for use in installing and removing heavy transmissions and differentials such as those found in large trucks, buses and other heavy duty vehicles.

The handling of transmissions during installation and removal presents an especially difficult problem in balancing and retaining the transmissions and this is especially the case when the transmission is being installed since it must be precisely aligned in the vehicle to be in proper operating position. Previous jacks and attachments for installing transmissions are unacceptable for balancing and handling large transmissions because they are cumbersome and lack either adequate support or adequate means for balancing the transmission and disposing it in proper position. It hardly needs to be stated that the devices must further be capable of locking the transmission or differential in place against dropping to prevent accidental damage to the operator or the part being handled.

One of the objects of the present invention is to provide an attachment for lift jacks which can handle with facility the very large transmissions and differentials which are found in heavy duty trucks and the like vehicles.

It is a further object of the invention to provide an attachment which can be readily adjusted to dispose the transmission in its proper operating position during installation and with a minimum of effort so that the transmission may be relatively easily handled and lifted into place for installation.

Conversely, it is an object of the invention to provide an attachment for a jack which can be easily raised into position and then coupled with the transmission in such manner that the transmission is held firmly in place and can be safely and easily lowered.

It is a further object of the invention to provide several alternate means which are readily interchangeable to adapt the attachment for handling various shapes and sizes of transmissions and differentials so that the same attachment is suitable for servicing a wide assortment of sizes and shapes of transmissions and differentials.

Other objects and features of the invention will become apparent from a consideration of the following description which proceeds with reference to the accompanying drawings, wherein:

FIGURE 1 is an exploded view of the attachment with its various components shown detached;

FIGURE 2 illustrates an alternate retaining means which in interchangeable with the retaining means shown in FIGURE 1 and is particularly adapted for handling differentials;

FIGURE 3 is a further support device which is suitable for use with the attachment shown in FIGURE 1 and is intended for use with certain types of transmissions; and, FIGURE 4 shows the attachment in FIGURE 1 as it is assembled and installed on a lift jack.

Referring now to the drawings, the lift jack which is designated generally by reference numeral 10 in FIGURE 4 is supported on rollers 12, 14 (and a third, not shown) which form a tripod support arrangement whereby the jack can be readily wheeled from one location to the other.

The rollers are spaced widely apart in relation to the center of gravity of the supported load so that there is sufficient stability against tipping of the jack under the weight of the load. The lift jack 10, which does not constitute an integral part of the present invention, comprises a housing 16 and two legs 18 and 20 extending angularly therefrom. Within the housing 16 is a hydraulic cylinder 22 having a hydraulically operated piston (not shown) and piston rod 24 which is raised and lowered by operation of the handle 26. A cross bar 27 is secured to the piston rod 24 and has at its opposite ends lugs 28 and 30 provided with pinned connections 32 and 34 which pass through lift bars 36 and 38 pivotally mounted on cross bolt 40.

As a result of operation of the handle 26 through an up and down motion, the piston rod 24 is raised or lowered thus swinging lift bars 36 and 38 upwardly or downwardly and thereby raising or lowering attachment 42 which is secured at the end of lift bars 36 and 38. The attachment 42 is the subject of the present invention and it is in no way limited to the specific jack construction which is described only as one suitable jack construction with which the present invention may be used. The attachment comprises a platform 44 having openings 46 by which the platform 44 may be suitably secured to the lift bars 36 and 38. Two transverse tracks 48 and 50 are disposed generally perpendicularly to the platform 44 and can be permanently affixed thereto by welding, bolting or the like.

Considering first track 48, there is a slot 52 extending through its length and two clamping arms 54 and 56 having base portions 58 and 60 each provided with notches 62 and 64 which are so proportioned that the base 58 can slide within track 48. Threaded openings 66 and 68 receive bolts 70 which are screwed within holes 66 and 68 to lock the arms 54 and 56 in a given position within track 48. The arms 1 and 2 clamp one on each side of the transmission which is held firmly between the two arms 54 and 56. The transmission rests on track 48 with the center of gravity of the transmission located slightly beyond edge 72 of the track 48. Retaining means 74 having a base 76 and notches 78, 80 is proportioned so that base 76 will slide within track 50 and along the length of the track to a predetermined position.

The retaining means 74 includes a chain 81 having an end link 82 permanently fastened to the retaining means 74 and the chain is of sufficient length so that it can be passed over the top of the transmission and then one of the end links 84 fitted into pin 86; the chain 81 may be pulled tight before the link in closest proximity to the pin 86 is passed within pin 86 so that the transmission is held securely against edge 88 of the retaining means 74. The chain is not necessarily pulled taut, however, before fastening to the pin 86. The structure described thus far is suitable for handling both transmissions and differentials and has been successfully employed with a wide assortment of sizes and shapes of differentials and transmissions found on heavy duty vehicles.

The retaining means 74 may be modified as shown in FIGURE 2 to make the attachment 42 especially suited for handling differentials. In this embodiment, a key 90 having an elongated slot 92 is fastened to the back plate 93 of retaining means 74 by means of a bolt 96 passed through the elongated slot 92 and screwed within opening 98 to clamp the key 90 at whatever level is desired. The chain lengths 100 and 102 are then passed over the differential and pin 104 then slipped through one of the links of chain length 100 to lash the transmission in place. Opening 106 of the key 90 then accommodates a bolt which is screwed into a companion flange of the differential to stabilize the differential against movement.

In operation, with the retaining means 74 shown in FIGURE 2, the transmission (or differential) is disposed on the attachment 42 of the jack 10, FIGURE 4, so that the two arms 54 and 56 lie one on each side of the transmission. The transmission rests on track 48 and its center of gravity may extend slightly beyond edge 72 so that the transmission is slightly overbalanced and tends to tip slightly with the underbalanced end extending toward retaining means 74. The two arms 54 and 56 are caused to slide toward each other to grip the transmission therebetween and the bolts 70 are then tightened to lock the arms 54 and 56 in place and thereby hold the transmission against slipping off of the platform 44. The underbalanced end of the transmission which extends toward retaining means 74 is lashed in place by means of the chain 81 which is passed over the top of the transmission and one of the links is then passed into the pin 86 so that the chain 81 holds the underbalanced end downwardly and against edge 88 of the retaining means. The retaining means 74, before securement to the transmission, can be moved along the length of track 50 according to the shape and size of the transmission to obtain the most suitable point of attachment with the transmission, and the chain 81 may be slackened or tightened so that the transmission will be at the proper inclination for assembly when the transmission is elevated by the jack 10.

With the transmission in place, handle 26 is then operated to raise the piston rod 24 and thereby lift the platform 44 together with the transmission which is thereby swung upwardly into position for attachment with the vehicle.

Conversely, to lower a transmission already installed on a truck or vehicle, the handle 26 is operated to raise the piston rod 24 and lift the attachment 42 so that it is in place for attachment with the transmission and subsequent lowering thereof.

Referring next to the embodiment shown in FIGURE 2, the retaining means 94 operates essentially the same as the retaining means 74 in FIGURE 1 except that the embodiment in FIGURE 2 is used primarily for differentials whereas the retaining means 74 in FIGURE 1 can be used for both differentials and transmissions. The key 90 is secured to the retaining means 74 and is adjusted vertically through the elongated slot 92 so that opening 106 registers with a threaded hole in a companion flange (not shown) of the differential (also not shown). The bolt 96 is then tightened down and the key 90 is bolted to the differential through opening 106. The boomer chains 100, 102 are then lashed around the differential and pin 104 is passed through one of the links of chain length 100. The operation of arms 54 and 56 is essentially the same, as previously described.

The retaining means shown in FIGURE 2 has been used in combination with the attachment 42, FIGURE 1, for handling truck differentials of a size ranging from 100 to 800 pounds, this providing some indication of the versatility and strength of the attachment 42. With the retaining means 74 shown in FIGURE 1, I have successfully handled transmissions ranging in size from 75 pounds to 1200 pounds and have found that the transmissions can be easily balanced and properly aligned through the range of these sizes.

Heretofore, it has been particularly difficult to obtain proper positioning of the transmissions but no problem of alignment during installation is encountered in the present invention.

Referring next to the embodiment shown in FIGURE 3, there is shown a substitute structure for the retaining means 74 and which is intended for use with the balance of the attachment structure 42 shown in FIGURE 1.

The structure in FIGURE 3 is intended for use in handling large transmission devices and is secured to the attachment by means of a pocket 107 which is proportioned to receive ends 108 and 110 of track 50. The device 112 has three sides 114, 116 and 118 which are constructed from angle irons and a reinforcement 120 at the bottom of the sides 114, 116 and 118. The reinforcement 120 rests on the upper surface of the track 50 with edge 122 providing a rest for one end of the transmission and the inner surfaces of sides 114 and 118 providing lateral support for the transmission. The structure described is best adapted for large transmissions and, as mentioned, is interchangeable with the fastening means 74 and 94, respectively.

Although the invention has been described in connection with a few selected embodiments of the invention, it will be understood that these are illustrative and are in no sense restrictive thereof. It is reasonably to be expected that those skilled in the art can make numerous adaptations and revisions of the invention as suit individual design requirements and it is intended that such revisions and variations as incorporate the herein disclosed principles will be included within the scope of the following claim as equivalents of the invention.

What is claimed is:

An attachment in combination with a jack for raising and lowering transmissions, differentials and the like during installation or repair thereof:

(a) said attachment comprising a platform adapted to be carried by an elevatable portion of said jack, (b) a portion of said platform providing a load engaging support surface for said transmission or differential, (c) means forming two transverse tracks disposed in perpendicular relation to each other and secured to said platform, (d) means defining slots within said tracks and extending substantially the entire length of said tracks, (e) two generally vertically disposed elongated guide arms having slide portions received within the slot of one of said tracks and movable adjustably one toward the other in clamping relation with said transmission or differential which is located therebetween, (f) means for locking said arms in a preselected position wherein said guide arms are in clamping relation with said transmission or differential, (g) retaining means slidably mounted in the other slot of said tracks in a direction generally perpendicular to the line of movement of said guide arms, (h) a chain connected at one end of said retaining means and passed over said transmission and thereafter secured through its free end to said retaining means to overlie the transmission or differential and prevent its rocking movement on said platform about the load engaging support surface provided by said platform, and (i) means for securing said attachment with said jack whereby the attachment is lifted or lowered with its transmission or differential load coupled therewith.

References Cited in the file of this patent

UNITED STATES PATENTS

| | | |
|---|---|---|
| 1,021,773 | Grub | Apr. 2, 1912 |
| 1,490,608 | Gilmour | Apr. 15, 1924 |
| 2,747,837 | Turner | May 29, 1956 |
| 2,838,278 | Johnsen | June 10, 1958 |